United States Patent
Wines

[15] 3,636,595
[45] Jan. 25, 1972

[54] COILING CLIP FOR COILING AND STORING LINEAR FLEXIBLE MATERIAL

[72] Inventor: David D. Wines, 25545 Tweed Drive, Franklin, Mich. 48025

[22] Filed: May 22, 1970

[21] Appl. No.: 39,591

[52] U.S. Cl. .................................................. 24/81 CC
[51] Int. Cl. .................................................. A44b 21/00
[58] Field of Search ............... 24/81 CC, 81 PH, 81 B, 81 G, 24/73 SA, 259 C; 248/68, 73

[56] References Cited

UNITED STATES PATENTS

| | | | |
|---|---|---|---|
| 2,011,521 | 8/1935 | Lorenz | 24/81 CC |
| 2,723,431 | 11/1955 | Di Renzo | 24/81 CC |
| 2,799,907 | 7/1957 | Kohtz | 24/81 CC |
| 3,382,545 | 5/1968 | Spenner | 24/81 CC |
| 3,485,467 | 12/1969 | Fuchs et al. | 24/81 CC X |

FOREIGN PATENTS OR APPLICATIONS

| | | | |
|---|---|---|---|
| 234,262 | 5/1925 | Great Britain | 24/81 CC |
| 985,375 | 3/1965 | Great Britain | 248/68 |
| 510,671 | 1/1955 | Italy | 24/81 CC |

Primary Examiner—Donald A. Griffin
Attorney—Donnelly, Mentag & Harrington

[57] ABSTRACT

A coiling clip for coiling and storing linear flexible material, such as garden hoses, extension cords, ropes and the like. The coiling clip comprises at least a pair of U-shaped sockets which are made from suitable material having a spring or flexible quality, as for example, flat spring wire. The coil is used by pressing one end of the linear material to be coiled into one of the sockets and then forming a first loop and pressing the other end of the first loop into the socket. The user then moves the initial loop through his hands to continue coiling the entire length of the linear material.

4 Claims, 7 Drawing Figures

PATENTED JAN 25 1972 3,636,595
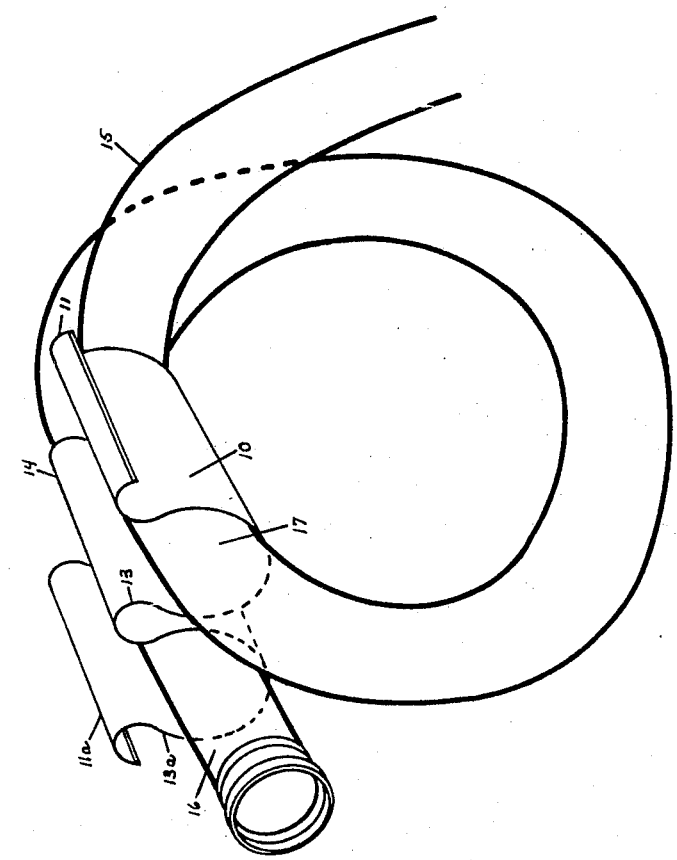
FIG. 2
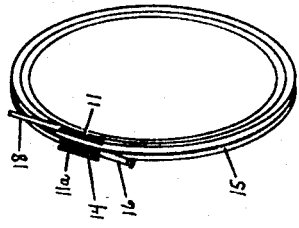
FIG. 3
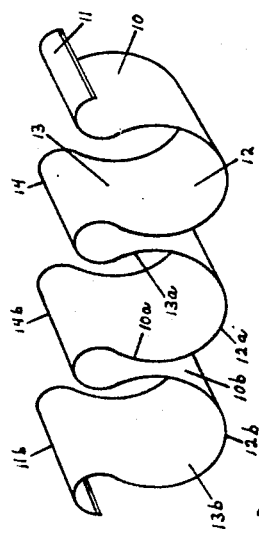
FIG. 1
FIG. 5
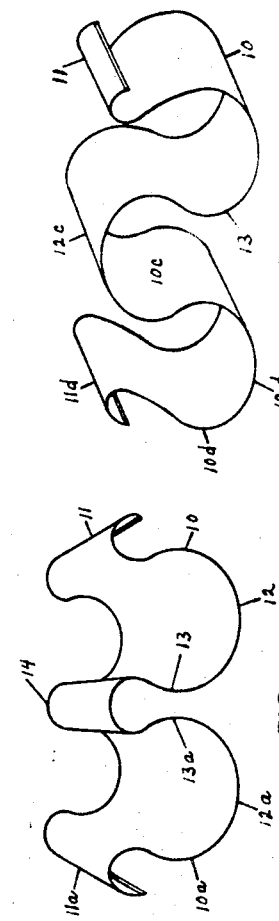
FIG. 7
FIG. 4
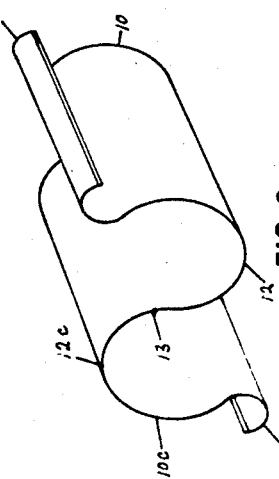
FIG. 6
INVENTOR.
DAVID D. WINES
BY
Donnelly, Mentag & Harrington
ATTORNEYS

COILING CLIP FOR COILING AND STORING LINEAR FLEXIBLE MATERIAL

SUMMARY OF THE INVENTION

This invention relates generally to items adapted for use in the coiling and storage of flexible linear materials, and more particularly, to a coiling clip for use with said materials.

The prior art products available for coiling garden hoses and the like include reels which are either mounted or wheels or stored on a wall. The prior art coiling reels are expensive and require substantial storage space when not in use. The type of reels which is adapted to be mounted on walls requires a garden hose to be wound by the conventional torsion producing action. There are also products on the market for mounting on the wall of a building, which have a curved surface over which garden hoses may be looped. The last mentioned device also requires the hose to be wound by conventional torsion producing methods. A hose coiled with the aforementioned wall mounted hose coiling and storing means makes it difficult to handle the finished or coiled hose because of the torsion effect created when coiling the hose.

In view of the foregoing, it is an important object of the present invention to provide a novel and improved coiling clip for quickly and efficiently coiling linear flexible material, such as garden hoses, in an economical manner. The coiling clip of the present invention may also be adapted for storing any flexible material after it has been coiled.

It is another object of the present invention to provide a novel and improved coiling clip for coiling garden hoses, electrical conduits, and the like, and which is simple and compact in construction, economical to manufacture and efficient in operation.

It is still another object of the present invention to provide a novel and improved coiling clip for linear flexible material which comprises a plurality of U-shaped members which are disposed in side-by-side relationship. The clip is made from a suitable flexible material, such as flat steel strip material, or plastic material. The clip may also be molded from a plastic material, or the like. The coiling clip is adapted to provide torsion free winding of linear flexible material, and it can be made in various sizes to accommodate different types of material.

Other objects, features and advantages of this invention will be apparent from the following detailed description, appended claims, and the accompanying drawing.

BRIEF DESCRIPTION OF THE DRAWING

FIG. 1 is a perspective view of a first illustrative coiling clip made in accordance with the principles of the present invention.

FIG. 2 is a perspective view of the coiling clip of FIG. 1, and showing the use of the coiling clip to make an initial coil when coiling a garden hose.

FIG. 3 is a perspective view of a coiled garden hose ready for storing and which has been coiled with the coiling clip of FIG. 1.

FIG. 4 is an end perspective of the coiling clip illustrated in FIG. 1.

FIG. 5 is a perspective view of a second illustrative coiling clip made in accordance with the principles of the present invention.

FIG. 6 is a perspective view of a third illustrative coiling clip made in accordance with the principles of the present invention.

FIG. 7 is a perspective view of a fourth illustrative coiling clip made in accordance with the principles of the present invention.

DETAILED DESCRIPTION OF THE PREFERRED EMBODIMENTS

FIG. 1 illustrates a first embodiment of the invention in which a coiling clip is provided with two side-by-side U-shaped sockets which are open at one end thereof and capable of securing an initial loop of a hose or the like which is to be coiled. The coiling clip comprises a first socket having an outer wall 10 and an inner wall 13. The wall 10 is provided on the upper end thereof with a turned-over edge 11. The bottom ends of the walls 10 and 13 are connected by an integral transverse or bight portion 12. The walls 10 and 13 and the interconnecting bight portion 12 provide a socket or acceptance opening which is substantially circular in cross section, as viewed from the end of the clip. It will be understood that other cross section shapes could be employed. A second adjacent socket is formed by a second pair of walls 10a and 13a which are joined at the bottom thereof by a bight portion 12a to provide an open upper end. The upper edge of the wall 13a is also provided with a turned-over edge 11a. The upper ends of the socket walls 13 and 10a are integrally connected by the rounded connecting wall 14.

The coiling clip illustrated in FIG. 1 may be made from any suitable material which has a spring or flexible quality, as for example, a flat ribbon-type spring steel strap material which is flexible so that the outer walls 10 and 10a may be flexed outwardly when a hose or the like is inserted therein. It will also be understood that the width of the walls of the sockets of the clips may be extended in certain cases when adapted for coiling material which is not too flexible, as for example, heavy gauge electrical cable, vinyl tubing, or the like. It will be understood that any suitable plastic material may also be used.

FIG. 2 illustrates the use of the coiling clip of the present invention for coiling purposes. The numeral 15 generally designates a conventional garden hose which is to be coiled. The end of the hose indicated by the numeral 16 is pressed downwardly into one of the sockets. The sidewall 13a would spring out to receive the hose end 16 and would then exert an inwardly directed gripping pressure on the end of the hose 16. The first or initial loop is then made and the desired point on the hose length as indicated by the numeral 17, is pressed into the other one of the sockets to form said first or initial loop. The hose may then be coiled by merely gripping the initial coil and turning it in the operator's hands and the initial coil functions as a guide for coiling-up the entire length of the hose. Both hands of the operator may be used for the coiling operation. The hose may be coiled without any torsion effect.

FIG. 3 illustrates the hose 15 in a fully-coiled position. When the hose is in the fully-coiled position it will be seen that the other end of the hose indicated by the numeral 18 may be inserted in the second socket for retaining the hose in the coiled position.

FIG. 5 illustrates a second illustrative embodiment of the invention in which a third socket has been integrally formed with the first two sockets. The parts of the third socket which are similar to the parts of the first two sockets have been indicated with the same reference numerals followed by the small letter "b." The coiling clip of FIG. 5 functions in the same aforedescribed manner as the first embodiment of FIGS. 1 through 4. It will be seen that by providing an extra socket, the coiling operation may be expedited, and the third socket may also be used for retaining the end of the hose, or the like, without having to remove the first looped portion at the end of the coiling operation.

FIG. 6 illustrates a third illustrative embodiment of the invention. The embodiment of FIG. 6 is also provided with two sockets, with the sockets disposed in a side-by-side relationship, the same as in the first embodiment of FIG. 1, and the second embodiment of FIG. 5, but they are reversed in vertical position relative to each other. That is, the first socket has its open end facing upwardly and the second socket has its open end facing downwardly. The adjacent walls of the two sockets are also formed as a single, or common, wall as indicated by the numeral 13. The parts of the embodiment of FIG. 6 which are the same as the first embodiment of FIG. 1 have been marked with the same reference numerals followed by the small letter "c." The embodiment of FIG. 6 would function in the same manner as described hereinbefore for the embodiment of FIG. 1.

FIG. 7 illustrates the fourth embodiment of the invention. The embodiment of FIG. 7 is similar to the embodiment of FIG. 6. It differs only in that it has a third socket which is upwardly facing in the same direction as the first socket. The parts of the embodiment of FIG. 7 which are the same as the embodiment of FIG. 6 have the same reference numerals followed by the small letter "d." The embodiment of FIG. 7 would function in the same way as the embodiment of FIG. 6.

It will be understood that the coiling clip of the present invention may be used for coiling various types of linear flexible material, such as, garden hose, extension cords, water skiing ropes, electrical conduit material, woven ropes and the like. The coiling clip permits the aforementioned linear material to be neatly coiled and secured in a coil for storing purposes. The coiling clip of the present invention may also be made in different sizes for use with different diameter linear flexible material.

While it will be apparent that the preferred embodiments of the invention herein disclosed are well calculated to fulfill the objects above stated, it will be appreciated that the invention is susceptible to modification, variation and change.

What is claimed is:

1. A coiling clip for hand coiling and storing a continuous linear flexible material comprising:
   a. two substantially U-shaped socket members having a radius portion that is effective for snugly receiving and releasably holding an elongated piece of linear flexible material which has a circular cross section,
   b. said socket members being connected in side-by-side relationship to hold a pair of linear flexible material portions in the same plane extending through the center of the socket members and in an adjacent relationship with respect to each other whereby the continuous linear material may be coiled in a torsion free condition,
   c. each socket member including a free-end located on the outer edge of the clip,
   d. each said free-end having a rolled configuration to facilitate the placing of said linear flexible material into each socket member while the flexible material is being coiled by hand, and
   e. said U-shaped socket members being composed of a band of resiliently flexible material, said band having a width greater than the thickness thereof so as to provide a gripping effect on a predetermined length of said linear flexible material.

2. A coiling clip as defined in claim 1 wherein
said two substantially U-shaped members are disposed with both open ends facing in the same direction.

3. A coiling clip as defined in claim 1 wherein
said two substantially U-shaped members are disposed with the open end of one member facing in one direction and the open end of the other member facing in the opposite direction.

4. A coiling clip as defined in claim 1 wherein
the two substantially U-shaped members are formed in a one-piece configuration.

* * * * *